(12) United States Patent
Dell et al.

(10) Patent No.: US 12,099,539 B2
(45) Date of Patent: Sep. 24, 2024

(54) EMBEDDING PERFORMANCE OPTIMIZATION THROUGH USE OF A SUMMARY MODEL

(71) Applicant: INTUIT INC., Mountain View, CA (US)

(72) Inventors: Krysten Nicole Dell, San Diego, CA (US); Jason Heckendorn, San Diego, CA (US); Lin Tao, Fremont, CA (US); Yingxin Wang, Newark, CA (US)

(73) Assignee: INTUIT INC., Mountain View, CA (US)

( * ) Notice: Subject to any disclaimer, the term of this patent is extended or adjusted under 35 U.S.C. 154(b) by 99 days.

(21) Appl. No.: 17/647,607

(22) Filed: Jan. 11, 2022

(65) Prior Publication Data

US 2023/0222149 A1 Jul. 13, 2023

(51) Int. Cl.
*G06F 17/00* (2019.01)
*G06F 16/34* (2019.01)
*G06F 16/35* (2019.01)
*G06N 7/01* (2023.01)
*G06N 20/00* (2019.01)

(52) U.S. Cl.
CPC ............ *G06F 16/35* (2019.01); *G06F 16/345* (2019.01); *G06N 7/01* (2023.01); *G06N 20/00* (2019.01)

(58) Field of Classification Search
CPC ....... G06F 16/35; G06F 16/345; G06N 20/00; G06N 7/01
USPC ........................................................ 715/254
See application file for complete search history.

(56) References Cited

U.S. PATENT DOCUMENTS

| | | | |
|---|---|---|---|
| 2005/0246410 A1* | 11/2005 | Chen ..................... | G06F 16/345 709/200 |
| 2019/0005962 A1* | 1/2019 | Martínez González ..................... | G10L 17/02 |
| 2019/0278835 A1* | 9/2019 | Cohan ................... | G06F 40/289 |
| 2020/0311122 A1* | 10/2020 | Ramamurthy ......... | G06N 20/20 |

(Continued)

OTHER PUBLICATIONS

Jonathan Pilault et al., 2020. On Extractive and Abstractive Neural Document Summarization with Transformer Language Models. In Proc. of the 2020 Conference on Empirical Methods in Natural Language Processing (EMNLP), pp. 9308-9319. (Year: 2020).*

(Continued)

*Primary Examiner* — Cesar B Paula
*Assistant Examiner* — James H. Blackwell
(74) *Attorney, Agent, or Firm* — Patterson + Sheridan, LLP

(57) ABSTRACT

Aspects of the present disclosure provide techniques for improved text classification. Embodiments include providing, based on a text string, one or more first inputs to a summary model. Embodiments include determining, based on one or more first outputs from the summary model in response to the one or more first inputs, a summarized version of the text string. In some embodiments the summarized version of the text string comprises a number of tokens that is less than or equal to a maximum number of input tokens for a machine learning model. Embodiments include providing, based on the summarized version of the text string, one or more second inputs to the machine learning model. Embodiments include determining one or more attributes of the text string based on one or more second outputs received from the machine learning model in response to the one or more second inputs.

21 Claims, 5 Drawing Sheets

(56) References Cited

U.S. PATENT DOCUMENTS

| | | | |
|---|---|---|---|
| 2021/0043211 A1* | 2/2021 | Leidner | G06F 16/35 |
| 2021/0375291 A1* | 12/2021 | Zeng | H04L 67/306 |
| 2022/0108086 A1* | 4/2022 | Wu | G06F 40/35 |
| 2022/0129556 A1* | 4/2022 | Chen | G06F 21/74 |
| 2022/0189484 A1* | 6/2022 | Malladi | G10L 15/01 |
| 2022/0392434 A1* | 12/2022 | Asi | G10L 15/063 |

OTHER PUBLICATIONS

Grail, Q., Perez, J., & Gaussier, E. (2021, April). Globalizing BERT-based transformer architectures for long document summarization. In Proceedings of the 16th conference of the European chapter of the Association for Computational Linguistics: Main volume (pp. 1792-1810). (Year: 2021).*

Ghosh Roy, Sayar & Pinnaparaju, Nikhil & Jain, Risubh & Gupta, Manish & Varma, Vasudeva. (2020). Summaformers @ LaySumm 20, LongSumm 20. 336-343. 10.18653/v1/2020.sdp-1.39. (Year: 2020).*

Ying, S. et al., "LongSumm 2021: Session based automatic summarization model for scientific document" (Year: 2021).*

Lasse Kohlmeyer, Tim Repke, and Ralf Krestel. 2022. Novel Views on Novels: Embedding Multiple Facets of Long Texts. In IEEE/WIC/ACM International Conference on Web Intelligence and Intelligent Agent Technology (WI-IAT '21). Association for Computing Machinery, New York, NY, USA, 670-675. (Year: 2022).*

Wan, Lulu & Seddon, Michael & Papageorgiou, George & Bernardoni, Mirko. (2019). Long-length Legal Document Classification. 10.13140/RG.2.2.36657.12646. (Year: 2019).*

Pappagari, Raghavendra & Żelasko, Piotr & Villalba, Jesús & Carmiel, Yishay & Dehak, Najim. (2019). Hierarchical Transformers for Long Document Classification. 838-844. 10.1109/ASRU46091.2019.9003958. (Year: 2019).*

Lewis, Mike et al., "BART: Denoising Sequence-to-Sequence Pretraining for Natural Language Generation, Translation, and Comprehension." Annual Meeting of the Association for Computational Linguistics, 10 pages. (Year: 2019).*

Chi, Sun & Qiu, Xipeng & Xu, Yige & Huang, Xuanjing. (2019). How to Fine-Tune BERT for Text Classification? (Year: 2019).*

Moro, G. and Ragazzi, L. 2022. Semantic Self-Segmentation for Abstractive Summarization of Long Documents in Low-Resource Regimes. Proceedings of the AAAI Conference on Artificial Intelligence. 36, 10 (Jun. 2022), 11085-11093. DOI:https://doi.org/10.1609/aaai.v36i10.21357. (Year: 2022).*

Cheng, R., "Abstractive Summarization Using Pytorch," (c) Jan. 17, 2021, Pub. in Towards Data Science, 12 pages. (Year: 2021).*

Mandar Joshi et al. 2019. BERT for Coreference Resolution: Baselines and Analysis. In Proceedings of the 2019 Conference on Empirical Methods in Natural Language Processing and the 9th International Joint Conference on Natural Language Processing (EMNLP-IJCNLP), pp. 5803-5805 (Year: 2019).*

Zhang, Y. et al., 2021. SummN: A Multi-Stage Summarization Framework for Long Input Dialogues and Documents: A Multi-Stage Summarization Framework for Long Input Dialogues and Documents. In Pr (Year: 2021).*

Tensorflow, "Classify Text with BERT," downloaded from https://web.archive.org/web/20210528172551/https://www.tensorflow.org/text/tutorials/classify_text_with_bert, archive date May 28, 2021, 31 pages. (Year: 2015).*

Siddhartha Banerjee, Prasenjit Mitra, and Kazunari Sugiyama. 2015. Generating Abstractive Summaries from Meeting Transcripts. In Proceedings of the 2015 ACM Symposium on Document Engineering (DocEng '15). Association for Computing Machinery, New York, NY, USA, 51-60. (Year: 2015).*

Jian Zhang and Pascale Fung. 2010. A rhetorical syntax-driven model for speech summarization. In Proceedings of the 23rd International Conference on Computational Linguistics (COLING '10). Association for Computational Linguistics, USA, 1299-1307. (Year: 2010).*

C. Hori and S. Furui, "A new approach to automatic speech summarization," in IEEE Transactions on Multimedia, vol. 5, No. 3, pp. 368-378, Sep. 2003. (Year: 2003).*

Briggs, J., "How to Apply Transformers to Any Length of Text, Restore the Power of NLP for Long Sequences, " Mar. 10, 2021, 10 total pages. (Year: 2021).*

Thorsten Ruprechter, Foaad Khosmood, and Christian Guetl. 2020. Deconstructing Human-assisted Video Transcription and Annotation for Legislative Proceedings. Digit. Gov.: Res. Pract. 1, 3, Article 19 (Jul. 2020), 24 pages. (Year: 2020).*

Juan Hussain, Mohammed Mediani, Moritz Behr, M. Amin Cheragui, Sebastian Stüker, and Alexander Waibel. 2020. German-Arabic Speech-to-Speech Translation for Psychiatric Diagnosis. In Proceedings of the Fifth Arabic Natural Language Processing Workshop, pp. 1-11 (Year: 2020).*

Ruprechter, T., Increasing Efficiency In Video Transcription, May 2018, 54 pages. (Year: 2018).*

\* cited by examiner

EMBEDDING PERFORMANCE OPTIMIZATION THROUGH USE OF A SUMMARY MODEL

INTRODUCTION

Aspects of the present disclosure relate to techniques for optimizing performance of a process for determining embeddings of text through the use of a summary model.

BACKGROUND

Every year millions of people, businesses, and organizations around the world utilize software applications to assist with countless aspects of life. Text content is frequently input and processed by software applications for a variety of purposes, such as performing automatic actions based on text (e.g., automatically responding to text, classifying text, providing relevant context based on text, transmitting text for communication purposes, or the like). In some cases, text may be processed to determine whether it may contain certain types of content, i.e., whether it relates to particular subject matter.

In many cases, embedding models are used to determine embeddings of text strings. An embedding of a text string is generally an n-dimensional vector representing a text string as a vector in n-dimensional space. Embedding models generally have limitations on the number of inputs (e.g., characters, words, tokens, or the like) that they can receive via an input layer. As such, it may be difficult to determine embeddings of large text strings using existing embedding models. Furthermore, many text strings have a considerable amount of "noise," such as characters and words that are not relevant to a particular classification problem. For example, a transcript of a call may contain a significant amount of small talk and other irrelevant information that, when processed by an embedding model, may result in imprecise embeddings. In many cases, misclassifications and other errors may occur if text is classified a certain way based on imprecise embeddings.

As such, there is a need in the art for improved techniques for classifying text, particularly where embedding models, which may have an input length limit, are employed to determine embeddings for long or noisy text strings.

BRIEF SUMMARY

Certain embodiments provide a method for improved performance in text classification. The method generally includes: providing, based on a text string comprising a first number of tokens, one or more first inputs to a summary model that has been trained to generate summaries of input text; receiving one or more first outputs from the summary model in response to the one or more first inputs; determining, based on the one or more first outputs, a summarized version of the text string, wherein: the summarized version of the text string comprises a second number of tokens that is less than the first number of tokens; and the second number of tokens is less than or equal to a maximum number of input tokens for a machine learning model; providing, based on the summarized version of the text string, one or more second inputs to the machine learning model; and determining one or more attributes of the text string based on one or more second outputs received from the machine learning model in response to the one or more second inputs.

Other embodiments provide a method for improved performance in text classification. The method generally includes: providing, based on a text string comprising a first number of tokens, one or more first inputs to a summary model that has been trained to generate summaries of input text; receiving one or more first outputs from the summary model in response to the one or more first inputs; determining, based on the one or more first outputs, a summarized version of the text string, wherein: the summarized version of the text string comprises a second number of tokens that is less than the first number of tokens; and the second number of tokens is less than or equal to a maximum number of input tokens for an embedding model that has been trained to generate embeddings of text; providing, based on the summarized version of the text string, one or more second inputs to the embedding model; and determining one or more attributes of the text string based on one or more second outputs received from the embedding model in response to the one or more second inputs.

Other embodiments provide a system comprising one or more processors and a non-transitory computer-readable medium comprising instructions that, when executed by the one or more processors, cause the system to perform a method. The method generally includes: providing, based on a text string comprising a first number of tokens, one or more first inputs to a summary model that has been trained to generate summaries of input text; receiving one or more first outputs from the summary model in response to the one or more first inputs; determining, based on the one or more first outputs, a summarized version of the text string, wherein: the summarized version of the text string comprises a second number of tokens that is less than the first number of tokens; and the second number of tokens is less than or equal to a maximum number of input tokens for a machine learning model; providing, based on the summarized version of the text string, one or more second inputs to the machine learning model; and determining one or more attributes of the text string based on one or more second outputs received from the machine learning model in response to the one or more second inputs.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
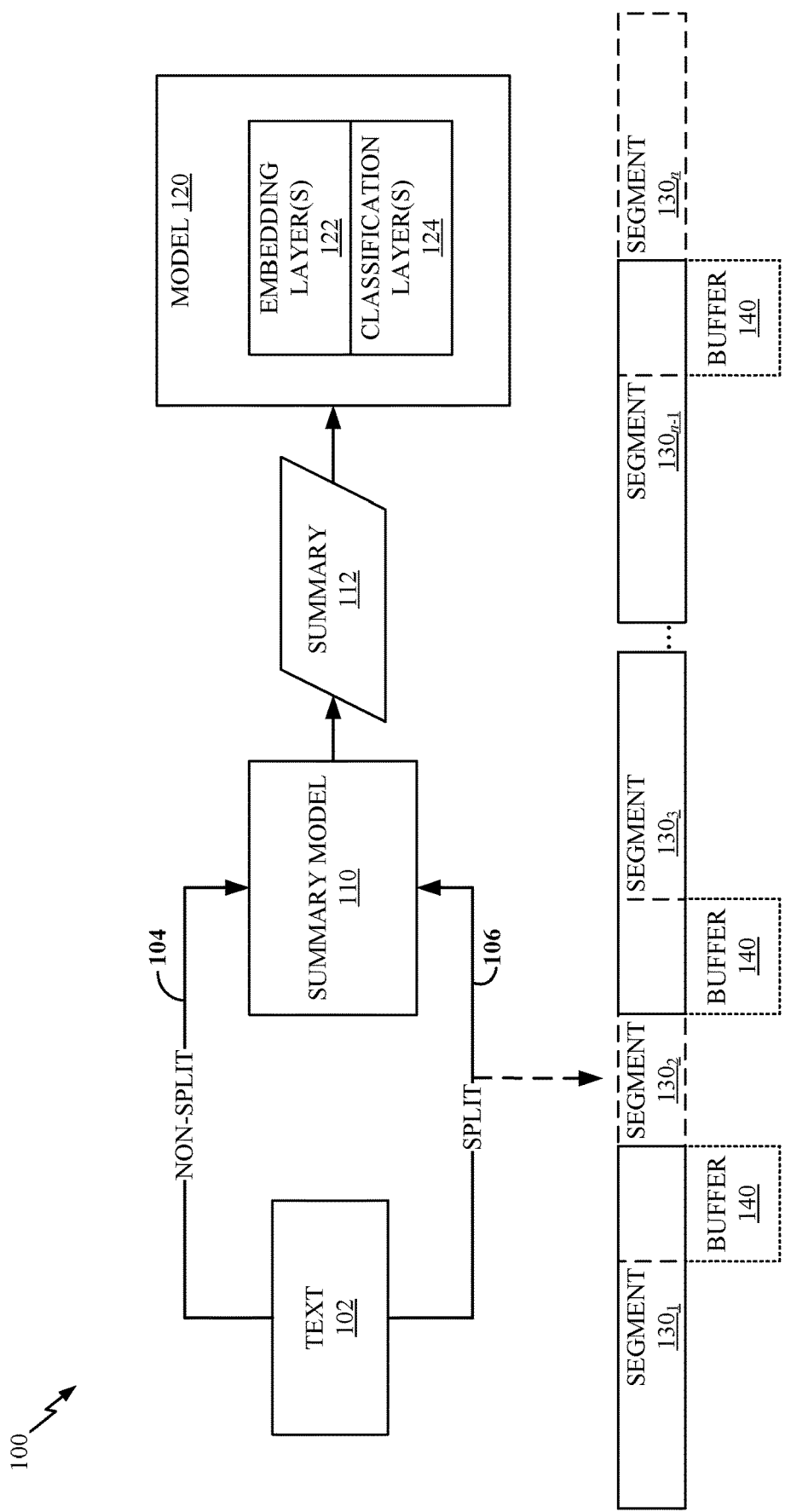
FIG. 1 depicts an example related to improved performance in text classification.

Aspects of the present disclosure provide apparatuses, methods, processing systems, and computer-readable mediums for improved performance in determining embeddings, such as for text classification.

Embodiments described herein involve utilizing a summary model to produce concise summaries of text prior to using an embedding and/or classification model to determine an embedding and/or classification of the text. In an example, text includes the transcript of a conversation between a user of a software application and a support professional (e.g., from a text conversation or generated using a speech-to-text technique based on audio of the conversation). There may be various reasons to classify the transcript, such as determining whether the transcript includes a particular type of subject matter in order to take additional action based on the determination. In one example, if the transcript is classified as including professional advice it may be sent to an expert for review (e.g., to confirm accuracy, to extract professional advice from the transcript for use in generating automated help content, and/or the like). In another example, if the transcript is classified as including an attempt by a support professional to poach customers (e.g., a request to contact the support professional offline for independent services), then the transcript may be flagged for additional review (e.g., to determine whether to take action against the support professional).

In order to classify text, an embedding model may be used to determine an embedding of the text. Details of embedding models are described in more detail below with respect to FIGS. 1 and 2. However, embedding models generally have an input length limit. For example, an embedding model may not be able to accept inputs exceeding a threshold number of words, characters, tokens, or the like. Thus, if text (e.g., a transcript) exceeds the input length limit of the embedding model, the full text may not be able to be processed to determine a single embedding of the full text using the embedding model. Furthermore, noise in the text (which is particularly common in transcripts, such as due to irrelevant conversational exchanges) may result in an imprecise embedding being produced by the embedding model.

As such, techniques described herein involve the use of a summary model. As described in more detail below with respect to FIGS. 1 and 2, a summary model is a machine learning model that receives text as an input and outputs a summarized version of the text. For example, the summary model may be trained based on a large corpus of text to perform "denoising" and to capture the essential meaning of the text in a shorter form. The maximum output length of the summary model may be a configurable parameter. For example, if the maximum output length of the summary model is set to 500 tokens, then a summary output by the summary model in response to input text will be no more than 500 tokens regardless of the length of the input text. Tokens may, for example, refer to separate groups of characters, such as individual words and numbers that are separated by spaces and/or other delimiters in a record. The maximum output length of the summary model may be set based on an input length limit for an embedding model, thereby ensuring that the summary output by the summary model may be fully processed by an input layer of the embedding model.

While some embodiments involve providing the entire text as input to the summary model to produce a single summary output, other embodiments involve breaking the text into segments for independent summarization by the summary model and then concatenating the independent summaries output by the summary model to produce an overall summary for the text. Breaking the text into segments may, in some cases, allow a more thorough summary to be produced by ensuring that the summary model focuses separately on individual segments rather than summarizing a potentially large string of text in a single output.

The summary of the text, whether produced based on segments of the text or the entirety of the text at once, is provided to the embedding model in order to determine an embedding of the text. The embedding is then used to determine one or more attributes of the text, such as whether the text contains a certain type of content. In one example, one or more classification layers are added to the embedding model to generate a classification model that outputs a classification of the text based on the embedding. For example, a classification layer may be a fully-connected layer that is trained based on historically classified text embeddings to output an indication of whether given text corresponds to one or more classifications (e.g., whether the text contains certain content or relates to a certain subject) based on an embedding of the given text (e.g., generated by the embedding model). In another example, an embedding output by the embedding model is provided to a clustering model to determine whether the embedding is similar to embeddings of other text strings known to contain certain content.

Action may be taken based on the one or more attributes of the text. For example, if the text is determined to contain certain content, then the text may be displayed to a particular user (e.g., an expert) for further review (e.g., to confirm whether the text contains professional advice such as tax advice or to confirm whether the text contains an attempt by a support professional to poach a customer). In another example, content may be targeted to a user associated with the text based on a determination that the text contains certain content. In yet another example, the text may be processed for inclusion in a self-help database if it is determined to contain content useful for self-help.

Techniques described herein improve the technical field of machine learning based text embedding and classification in a number of ways. For instance, by utilizing a summary model that is configured to output a summary of a certain length that is based on an input length limit of an embedding model, embodiments of the present disclosure solve the technical problem of determining an embedding of text that is too long to be processed by an input layer of the embedding model. Furthermore, by automatically denoising text through the use of a summary model prior to determining an embedding, techniques described herein improve the precision of the embedding produced by an embedding model (e.g., as the embedding will no longer be influenced by irrelevant and/or superfluous text and will therefore better represent the significant content of the text), and thereby improve the accuracy of automated determinations of text attributes based on the embeddings. Experimental results indicate that utilizing a summary model to summarize text prior to providing inputs to an embedding model for determining embeddings of the text significantly reduces misclassifications made based on the embeddings.

Thus, even though certain concepts related to the present disclosure may be known, the present disclosure involves a combination of different techniques that provides a benefit beyond the sum of the benefits provided by each individual technique. For example, beyond producing a summary of text and producing an embedding of text, techniques described herein combine a summary model and an embedding model in such a way as to produce a more accurate embedding and to solve the problem of determining embeddings of text strings that exceed an input length limit of the embedding model.

Examples of Improved Performance in Text Classification

FIG. 1 is an illustration 100 of an example related to improved performance in text classification.

Summary model 110 is a machine learning model that has been trained to produce summaries of text. For example, summary model 110 may be a denoising autoencoder that is implemented as a sequence-to-sequence model with a bidirectional encoder over a string of text and a left-to-right auto-regressive decoder. Training of summary model 110 may involve optimizing the negative log likelihood of a summary. For instance, for training purposes, an original text string may be corrupted with an arbitrary noising function, and a sequence-to-sequence model may learn to reconstruct the original text string (e.g., through iterative adjustments to model parameters). In some cases, summary model 110 uses a standard transformer-based neural machine translation architecture. In one example, summary model is a bidirectional auto-regressive transformer (BART) model.

Model 120 comprises an embedding model (e.g., including one or more embedding layers 122) that has been modified to include one or more classification layers 124. The embedding model may be a neural network, and may learn a representation (embedding) for a text string through a training process that trains the neural network based on a data set, such as a plurality of text strings. An embedding may represent the meaning of a text string. In one example, the embedding model comprises a Bidirectional Encoder Representations from Transformer (BERT) model, which involves the use of masked language modeling to determine text embeddings. In other embodiments, the embedding model may involve embedding techniques such as Word2Vec and GloVe embeddings.

The one or more classification layers 124 may, for example, be linear or fully-connected neural network layers trained to output a classification of an embedding based on embeddings that have been labeled with known classifications, such as confirmed by an expert. A "linear" or "fully-connected" layer is a layer in which every neuron is connected to every neuron in another layer. In some embodiments, training of the one or more classification layers 124 may be a supervised learning process that involves providing training inputs (e.g., embeddings) as inputs to the model. The model processes the training inputs and outputs classifications (e.g., indicating whether the text represented by the embedding contains certain content or relates to a certain subject) with respect to the training inputs. The outputs are compared to the labels (e.g., known classifications) associated with the training inputs to determine the accuracy of the model, and the model is iteratively adjusted until one or more conditions are met. In some embodiments, the one or more classification layers 124 have an output dimension of two (e.g., representing true or false for a classification, indicating whether or not the text represented by the inputs is classified in a particular classification).

Model 120 is included as an example, and one or more other types of models may alternatively be used to determine one or more attributes of text based on a summary of the text determined using a summary model.

Text 102 represents a string of text that is to be processed for classification. For example, text 102 may be a transcript of a conversation between a user of a software application and a support professional, which may have been produced based on speech-to-text techniques or extracted from a text-based chat. In certain embodiments, a length of text 102 exceeds an input length limit of model 120. For example, a number of tokens in text 102 may exceed a number of tokens that can be processed by an input later of embedding layer(s) 122.

A non-split path 104 and a split path 106 are both depicted in illustration 100, and represent alternative techniques for providing inputs to summary model 110 based on text 102. In non-split path 104, the entirety of text 102 is provided to an input layer of summary model 110 at once, and summary 112 is output by summary model 110 in response to the inputs. For example, all tokens in text 102 may be provided as a single set of inputs to summary model 110, and summary model 110 may process all of these tokens and output summary 112.

In split path 106, a plurality of segments $130_{1-n}$ (collectively, segments 130 and individually, segment 130) are determined from text 102 and separately provided as inputs to summary model 110. Each segment 130 represents a portion of text 102 (e.g., a given number of characters or a given number of tokens from text 102). In some cases, segments 130 are overlapping segments, with buffer 140 representing an extent to which two consecutive segments overlap. For example, a buffer 140 of five characters or one token may be used, meaning that two consecutive segments 130 will share twenty characters or five tokens between them. In a particular example, the text string "this is an example of generating text segments" may be split into four segments of three tokens each, with a buffer of one token, as follows: "this is an," "an example of," "of generating text," and "generating text segments." This is included as an example for illustrative purposes, but the length of segments and the size of the buffer may be larger in practice. The number of segments and the size of the buffer may be configurable parameters. In alternative embodiments, segments 130 may be non-overlapping, and no buffer may be used. Determining whether to base the lengths of segments, buffers, model inputs, and/or the like on numbers of characters, tokens, or other units such as words or utterances is a design choice, and any of these may be used.

In split path 106, each segment 130 is separately provided to summary model 110, and summary model 110 outputs a separate summary for each segment 130. The overall summary 112 of text 102 is then generated by concatenating the separate summaries for all of segments 130 together. Thus, in split path, summary 112 may be more robust than a summary produced by non-split path 104, as it is based on concentrated summaries of individual, potentially overlapping, segments of the text.

An output length limit of summary model 110 may be configured based on the input length limit of model 120. For example, in non-split path 104, the output length limit of summary model 110 may be set to the same value as the input length limit of model 120 so that summary 112 can be fully processed by model 120. In split path 106, the output length limit of summary model 110 may be determined based on a number of segments 130 and the input length limit of model 120. For example, the output length limit of summary model 110 may be set to the result of dividing the input length limit of model 120 by the number of segments 130 so that the summary 112 produced by concatenating the separate summaries of segments 130 can be fully processed by model 120.

Summary 112 is provided to an input layer of model 120, and model 120 outputs a classification of text 102 based on summary 112. For example, embedding layer(s) 122 may output an embedding of text 102 based on summary 112, and classification layer(s) 124 may output the classification based on the embedding. The classification indicates one or more attributes of text 102, such as whether text 102 contains certain content or relates to a certain subject. In one particular example, the classification indicates whether text 102 includes professional advice, such as tax advice. As described in more detail below with respect to FIG. 3, one or more actions may be taken based on the classification, such as determining whether to provide text 102 to a user for review.

Figure 2:
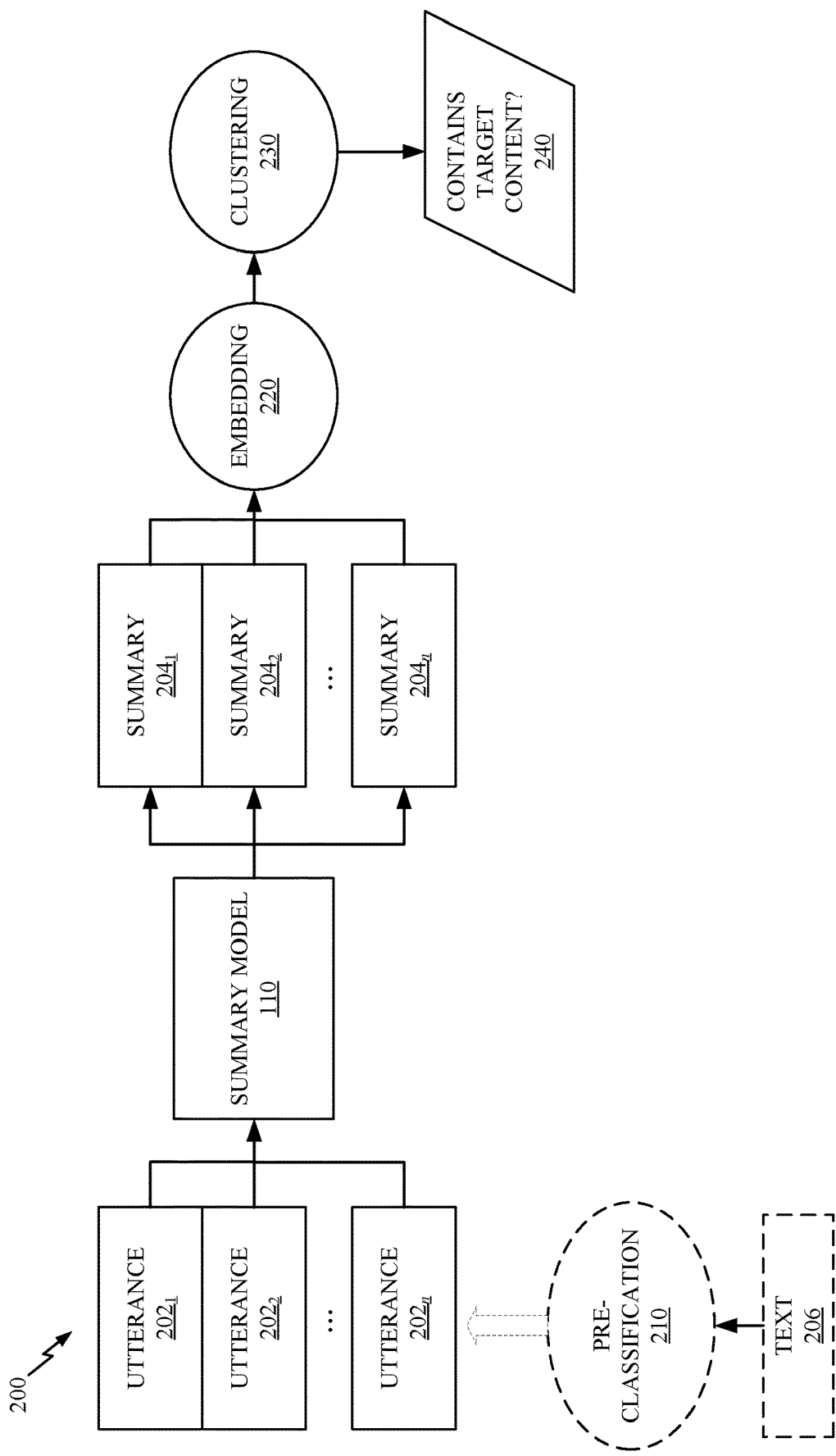
FIG. 2 depicts another example related to improved performance in text classification.

FIG. 2 is an illustration 200 of another example related to improved performance in text classification. Illustration 200 includes summary model 110 of FIG. 1.

In illustration 200, utterances 2021-$n$ (collectively, utterances 202 and individually, utterance 202) have been determined from text 206. An utterance generally refers to an independent statement that begins and ends with a pause and/or is otherwise delimited by punctuation (e.g., a sentence beginning with a capital letter and ending with a punctuation mark such as a period, exclamation point, or question mark). In some embodiments, utterances 202 comprise utterances included in a subset of text 206 that was determined through an optional pre-classification process 210 to potentially contain a certain type of target content. Pre-classification process 210 may, for instance, be an existing technique that involves the use of one or more machine learning models and/or other techniques by which text 206 is analyzed to determine whether it contains target content. Target content may, for example, refer to an attempt by a support professional to poach a customer. On technique for identifying potential poaching attempts in text is described in U.S. patent application Ser. No. 17/389,701, filed Jul. 30, 2021, the contents of which are incorporated herein by reference in their entirety. Embodiments described herein may reduce misclassifications produced by existing techniques through the use of summary model 110 prior to embedding 220 and clustering 230 stages. For example, the pre-classification process 210 may result in an identification of sentence from text 206 that could potentially contain a certain type of content. Utterances 202 may include all utterances from the identified sentence and, in some embodiments, a given number of utterances before and/or after the sentence in text 206 (e.g., to provide context).

Utterances 202 may be used in this case rather than other types of segments described above with respect to FIG. 1 because text 206 has already been processed through a pre-classification process 210 to identify a subset of text 206, and the subset is likely to be relatively short (e.g., a portion of a transcript that relates to a potential poaching attempt, such as a sentence and a given number of utterances before and/or after the sentence). By contrast, the text that is summarized in illustration 100 of FIG. 1 is likely to be longer (e.g., the entire transcript). In some cases, a determination of whether to use utterances or other types of segments (e.g., segments 130 of FIG. 1) as inputs to summary model 110 is based on a length of the text to be summarized. For example, if the number of utterances in the text is less than a threshold amount, then the text may be split into utterances. Otherwise, if the number of utterances meets or exceeds the threshold, then the text may be split into a given number of segments as described above (e.g., which may involve merging utterances together into segments in order to produce the given number of segments).

The output length limit of summary model 110 may be configured based on the number of utterances 202 and the input length limit of an embedding model used at embedding stage 220, such as by dividing the input length limit of the embedding model by the number of utterances 202. In certain embodiments, the output length limit of summary model 110 is defined according to the length of the utterances. For instance, the output length limit of summary model 110 may be set to the maximum of the minimum summary length of the utterances and the result of multiplying the length of the utterances by a summary length ratio, where the summary length ratio is equal to the input length limit of the embedding model divided by a maximum length of the text from which the utterances are extracted.

Each utterance 202 is provided separately to summary model 110 to produce a corresponding summary 204. For example, summary 2041 is output by summary model 110 in response to utterance 2021, and represents a summarized version of utterance 2021. Summaries 204 are concatenated together to produce an overall summary of the text, and the overall summary is provided to an embedding model at embedding stage 220. The embedding model outputs an embedding of the text based on the overall summary, and the embedding is provided to a clustering model at clustering stage 230.

The clustering model may perform clustering techniques based on embeddings, such as clustering embeddings based on cosine similarity. In one example, the clustering model is a Balanced Iterative Reducing and Clustering using Hierarchies (BIRCH) model. For example, embeddings may be clustered into topics such as poaching, small talk, tax advice, software-related technical questions, and/or the like. Thus, clustering stage 230 may result in a determination 240 of whether the text contains the target content. For example, if the embedding output from embedding stage 220 is clustered into the poaching topic at clustering stage 230, then determination 240 may indicate that the text contains a poaching attempt.

In one example, an output of the pre-classification process 210 indicates that the utterance "but I can do anything else outside of this application" is a potential poaching attempt. However, to determine whether this is a m, a given number of utterances before and after the utterance in text 206 are collected (e.g., five utterances before and five utterances after the utterance) to provide context, and all of these utterances (e.g., a total of eleven utterances) are fed into summary model 110 separately to produce eleven summaries. The eleven summaries are concatenated together to produce an overall summary, which is provided as input to an embedding model, and then an embedding output by the embedding model is provided to a clustering model. In this example, the clustering model clusters the embedding into an "operating software support" topic, therefore indicating that the sentence, while it seems like a poaching case, in fact relates to the support professional helping the customer with some "operating software" problem that is "outside of the application, and not attempting to poach the customer.

Experimental results indicate that techniques described herein may reduce misclassifications by at least 33% (e.g., compared to existing techniques) by identifying text that does not in fact contain a type of content when existing techniques indicated that the text did contain the type of content.

Example User Interface Screen

Figure 3:
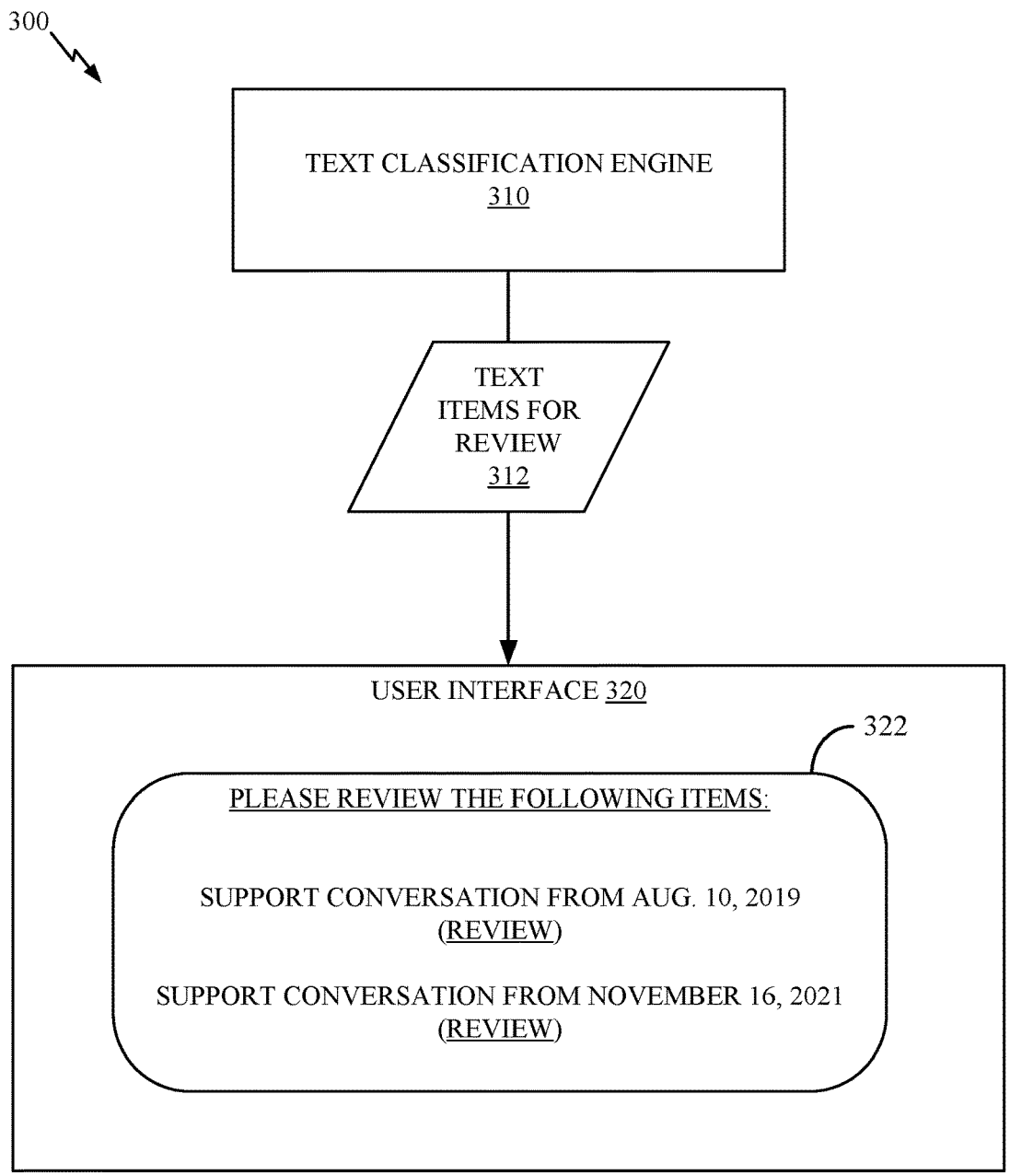
FIG. 3 depicts an example involving a user interface screen related to improved performance in text classification.

FIG. 3 is an illustration 300 of an example involving a user interface screen related to improved performance in text classification. Illustration 300 includes a text classification engine 310, which may perform operations described above with respect to illustrations 100 and 200 of FIGS. 1 and 2.

Text classification engine 310 determines text items 312 for review based on use of a summary model and embedding model as described above to identify text items that are likely to contain certain content. For example, text items 312 may include all text items classified as potentially containing professional advice (e.g., tax advice), poaching attempts, or other types of content based on summaries and embeddings.

Text classification engine 310 provides text items 312 to a user interface 320 for display. For example, user interface 320 may provide a user (e.g., a subject matter expert or administrator) with a screen 322 for reviewing text items in order to determine whether the text items in fact contain a target type of content. Screen 322 provides two support conversations for review. The user may click on the support conversation from Aug. 10, 2019 or the support conversation from Nov. 16, 2021 in order to review the conversation and confirm whether it contains the target type of content.

By utilizing a summary model as described herein to produce a summary of text prior to determining an embedding of the text, text classification engine 310 reduces misclassifications and identifies the text items 312 that are most likely to actually contain the target content, thereby avoiding providing potentially irrelevant text items to user interface 320 for review. As such, techniques described herein avoid utilizing processing, memory, and/or communication resources, as well as user interface screen space, for displaying irrelevant text items for review. Furthermore, techniques described herein improve the usability of user interface 320 by displaying the most relevant text items and avoiding clutter on screen 322 with misclassifications.

Example Operations for Improved Performance in Text Classification

Figure 4:
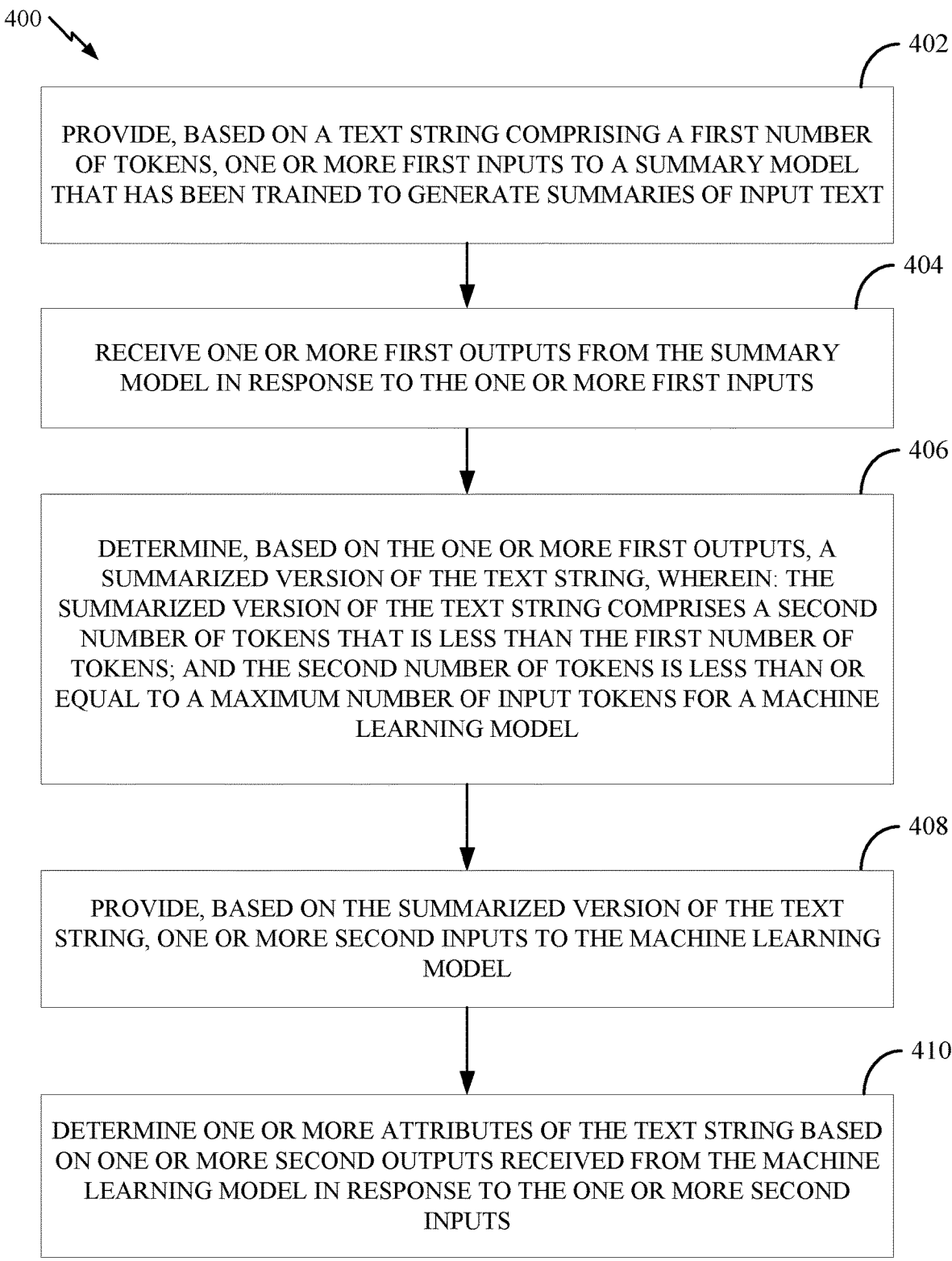
FIG. 4 depicts example operations for improved performance in text classification.

FIG. 4 depicts example operations 400 for improved performance in text classification. For example, operations 400 may be performed by text classification engine 310 of FIG. 3.

Operations 400 begin at step 402, with providing, based on a text string comprising a first number of tokens, one or more first inputs to a summary model that has been trained to generate summaries of input text. For example, the summary model may be summary model 110 of FIGS. 1 and 2 and the text string may be text 102 of FIG. 1 or a text string corresponding to utterances 202 of FIG. 2.

In some embodiments, providing the one or more first inputs to the summary model comprises splitting the text string into a plurality of segments and providing the plurality of segments as separate inputs to the summary model. For example, a first segment and a second segment of the plurality of segments may overlap with one another by a given number of characters. In some cases, determining, based on the one or more first outputs, the summarized version of the text string comprises concatenating a plurality of outputs from the summary model together to produce the summarized version of the text string.

Certain embodiments further comprise setting a maximum output length parameter of the summary model based on a number of the plurality of segments and the maximum number of input tokens for the machine learning model. The summary model may, for example, comprise a transformer model with a bidirectional encoder and an autoregressive decoder.

Operations 400 continue at step 404, with receiving one or more first outputs from the summary model in response to the one or more first inputs. For example, the one or more first outputs may be summary 112 of FIG. 1 and/or summaries 204 of FIG. 2.

Operations 400 continue at step 406, with determining, based on the one or more first outputs, a summarized version of the text string. In some embodiments, the summarized version of the text string comprises a second number of tokens that is less than the first number of tokens, and the second number of tokens may be less than or equal to a maximum number of input tokens for a machine learning model. For example, the summarized version of the text string may be summary 112 of FIG. 1 and/or a combination of summaries 204 of FIG. 2 (e.g., concatenated together). In some embodiments, rather than tokens, characters or another input unit may be used, and the summarized version of the text string may comprise a number of characters or other unit that is less than or equal to a maximum number of input characters or maximum number of other unit for the machine learning model.

Operations 400 continue at step 408, with providing, based on the summarized version of the text string, one or more second inputs to the machine learning model. In some embodiments, the machine learning model comprises an embedding model that has been trained to generate embeddings of text. In certain cases, the machine learning model comprises one or more classification layers. For example, the machine learning model may be model 120 of FIG. 1 or an embedding model of embedding stage 220 of FIG. 2.

Operations 400 continue at step 410, with determining one or more attributes of the text string based on one or more second outputs received from the machine learning model in response to the one or more second inputs. For example, determining the one or more attributes may correspond to determination 240 of FIG. 2. In some embodiments, determining the one or more attributes of the text string based on the one or more second outputs comprises determining whether the text string comprises a particular type of content. Certain embodiments further comprise performing one or more actions with respect to the text string based on whether the text string comprises the particular type of content.

Notably, method 400 is just one example with a selection of example steps, but additional methods with more, fewer, and/or different steps are possible based on the disclosure herein.

Example Computing System

Figure 5:
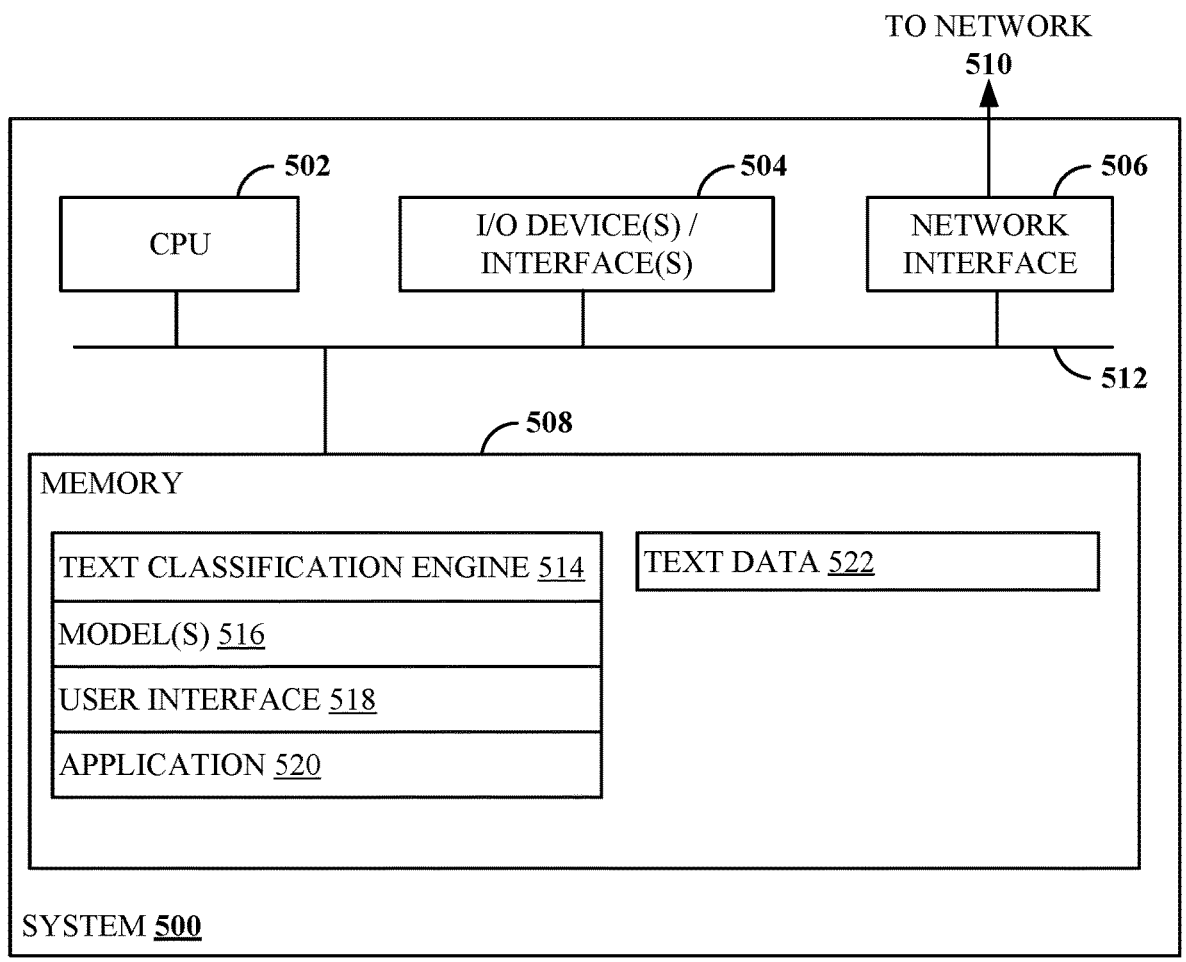
FIG. 5 depicts an example processing system for improved performance in text classification.

FIG. 5 illustrates an example system 500 with which embodiments of the present disclosure may be implemented. For example, system 500 may be configured to perform operations 400 of FIG. 4.

System 500 includes a central processing unit (CPU) 502, one or more I/O device interfaces 504 that may allow for the connection of various I/O devices 514 (e.g., keyboards, displays, mouse devices, pen input, etc.) to the system 500, network interface 506, a memory 508, and an interconnect 512. It is contemplated that one or more components of system 500 may be located remotely and accessed via a network 510. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes text classification engine 514, which may be representative of text classification engine 310 of FIG. 3. Memory 508 further includes one or more models 516, which may include summary model 110 and model 120 of FIG. 1 and one or more embedding and/or clustering models corresponding to embedding stage 220 and clustering stage 230 of FIG. 2. Memory 508 further includes user interface 518, which may represent user interface 320 of FIG. 3. Memory 508 further includes application 520, which may be representative of a software application associated with text that is processed and classified according to embodiments of the present disclosure. For example, text processed and classified via text classification engine 514 may be processed by application 520, such as to determine one or more other actions to take based on classified text (e.g., generating an automated response to the text, providing targeted content to a user based on the text, and/or the like).

Memory 508 further comprises text data 522, which may include data related to text classification, such as text 102, summary 112, and segments 130 of FIG. 1 and text 206, utterances 202, and summaries 204 of FIG. 2.

Example Clauses

Clause 1: A method for improved text classification, comprising: providing, based on a text string comprising a first number of tokens, one or more first inputs to a summary model that has been trained to generate summaries of input text; receiving one or more first outputs from the summary model in response to the one or more first inputs; determining, based on the one or more first outputs, a summarized version of the text string, wherein: the summarized version of the text string comprises a second number of tokens that is less than the first number of tokens; and the second number of tokens is less than or equal to a maximum number of input tokens for a machine learning model; providing, based on the summarized version of the text string, one or more second inputs to the machine learning model; and determining one or more attributes of the text string based on one or more second outputs received from the machine learning model in response to the one or more second inputs.

Clause 2: The method of Clause 1, wherein providing the one or more first inputs to the summary model comprises: splitting the text string into a plurality of segments; and providing the plurality of segments as separate inputs to the summary model.

Clause 3: The method of Clause 2, further comprising setting a maximum output length parameter of the summary model based on: a number of the plurality of segments; and the maximum number of input tokens for the machine learning model.

Clause 4: The method of any one of Clause 2-3, wherein a first segment and a second segment of the plurality of segments overlap with one another by a given number of characters.

Clause 5: The method of any one of Clause 2-4, wherein determining, based on the one or more first outputs, the summarized version of the text string comprises concatenating a plurality of outputs from the summary model together to produce the summarized version of the text string.

Clause 6: The method of any one of Clause 1-5, wherein determining the one or more attributes of the text string based on the one or more second outputs comprises determining whether the text string comprises a particular type of content.

Clause 7: The method of Clause 6, further comprising performing one or more actions with respect to the text string based on whether the text string comprises the particular type of content.

Clause 8: The method of any one of Clause 1-7, wherein the summary model comprises a transformer model with a bidirectional encoder and an autoregressive decoder.

Clause 9: A method for improved text classification, comprising: providing, based on a text string comprising a first number of tokens, one or more first inputs to a summary model that has been trained to generate summaries of input text; receiving one or more first outputs from the summary model in response to the one or more first inputs; determining, based on the one or more first outputs, a summarized version of the text string, wherein: the summarized version of the text string comprises a second number of tokens that is less than the first number of tokens; and the second number of tokens is less than or equal to a maximum number of input tokens for an embedding model that has been trained to generate embeddings of text; providing, based on the summarized version of the text string, one or more second inputs to the embedding model; and determining one or more attributes of the text string based on one or more second outputs received from the embedding model in response to the one or more second inputs.

Clause 10: The method of Clause 9, wherein providing the one or more first inputs to the summary model comprises: splitting the text string into a plurality of segments; and providing the plurality of segments as separate inputs to the summary model.

Clause 11: The method of Clause 10, further comprising setting a maximum output length parameter of the summary model based on: a number of the plurality of segments; and the maximum number of input tokens for the embedding model.

Clause 12: The method of any one of Clause 10-11, wherein a first segment and a second segment of the plurality of segments overlap with one another by a given number of characters.

Clause 13: The method of any one of Clause 10-12, wherein determining, based on the one or more first outputs, the summarized version of the text string comprises concatenating a plurality of outputs from the summary model together to produce the summarized version of the text string.

Clause 14: The method of any one of Clause 9-13, wherein determining the one or more attributes of the text string based on the one or more second outputs comprises determining whether the text string comprises a particular type of content.

Clause 15: The method of Clause 14, further comprising performing one or more actions with respect to the text string based on whether the text string comprises the particular type of content.

Clause 16: The method of any one of Clause 9-15, wherein the summary model comprises a transformer model with a bidirectional encoder and an autoregressive decoder.

Clause 17: A system for improved text classification, comprising: one or more processors; and a memory comprising instructions that, when executed by the one or more processors, cause the system to: provide, based on a text string comprising a first number of tokens, one or more first inputs to a summary model that has been trained to generate summaries of input text; receive one or more first outputs from the summary model in response to the one or more first inputs; determine, based on the one or more first outputs, a summarized version of the text string, wherein: the summarized version of the text string comprises a second number of tokens that is less than the first number of tokens; and the second number of tokens is less than or equal to a maximum number of input tokens for a machine learning model; provide, based on the summarized version of the text string, one or more second inputs to the machine learning model; and determine one or more attributes of the text string based on one or more second outputs received from the machine learning model in response to the one or more second inputs.

Clause 18: The system of Clause 17, wherein providing the one or more first inputs to the summary model comprises: splitting the text string into a plurality of segments; and providing the plurality of segments as separate inputs to the summary model.

Clause 19: The system of Clause 18, wherein the instructions, when executed by the one or more processors, further cause the system to set a maximum output length parameter of the summary model based on: a number of the plurality of segments; and the maximum number of input tokens for the machine learning model.

Clause 20: The system of any one of Clause 18-19, wherein a first segment and a second segment of the plurality of segments overlap with one another by a given number of characters.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for improved text classification, comprising:
    receiving a text string comprising a first number of tokens and a number of utterances;
    generating one or more first inputs based on the text string by:
        if the number of utterances is below a threshold amount, splitting the text into a plurality of utterances, and
        if the number of utterances is at or above the threshold amount, combining utterances of the plurality of utterances;
    providing the one or more first inputs to a summary model that has been trained to generate subject content summaries of input text;
    receiving one or more first outputs from the summary model in response to the one or more first inputs, the one or more first outputs including one or more subject content summaries;
    determining, based on the one or more first outputs, a summarized version of the text string, wherein:
        the summarized version of the text string comprises a second number of tokens that is less than the first number of tokens; and
        the second number of tokens is less than or equal to a maximum number of input tokens for a machine learning model;
    providing, based on the summarized version of the text string, one or more second inputs to the machine learning model; and
    determining one or more attributes of the text string based on one or more second outputs received from the machine learning model in response to the one or more second inputs.

2. The method of claim 1, wherein the number of utterances is at or above the threshold amount, wherein the combining of the utterances of the plurality of utterances comprises:
    splitting the text string into a plurality of utterances; and merging two or more utterances of the plurality of utterances, wherein the providing of the one or more first inputs to the summary model comprises providing the merged two or more utterances as an input to the summary model.

3. The method of claim 2, further comprising setting a maximum output length parameter of the summary model based on:
a number of utterances after the combining of the utterances; and
a maximum number of input tokens for the machine learning model.

4. The method of claim 2, wherein the two or more utterances overlap with one another by a given number of characters.

5. The method of claim 2, wherein determining, based on the one or more first outputs, the summarized version of the text string comprises concatenating a plurality of outputs from the summary model together to produce the summarized version of the text string.

6. The method of claim 1, wherein determining the one or more attributes of the text string based on the one or more second outputs comprises determining whether the text string comprises a particular type of content.

7. The method of claim 6, further comprising:
performing one or more actions with respect to the text string based on whether the text string comprises the particular type of content.

8. The method of claim 1, wherein the summary model comprises a transformer model with a bidirectional encoder and an autoregressive decoder.

9. The method of claim 1, wherein the plurality of utterances comprises a plurality of independent statements delimited by a selection from: a pause, a punctuation mark, or a capitalized letter.

10. A method for improved text classification, comprising:
receiving a text string comprising a first number of tokens and a number of utterances;
generating one or more first inputs based on the text string and the text string length by:
if the number of utterances is below a threshold amount, splitting the text into a plurality of utterances, and
if the number of utterances is at or above the threshold amount, combining utterances of the plurality of utterances;
providing the one or more first inputs to a summary model that has been trained to generate subject content summaries of input text;
receiving one or more first outputs from the summary model in response to the one or more first inputs, the one or more first outputs including one or more subject content summaries;
determining, based on the one or more first outputs, a summarized version of the text string, wherein:
the summarized version of the text string comprises a second number of tokens that is less than the first number of tokens; and
the second number of tokens is less than or equal to a maximum number of input tokens for an embedding model that has been trained to generate embeddings of text;
providing, based on the summarized version of the text string, one or more second inputs to the embedding model; and
determining one or more attributes of the text string based on one or more second outputs received from the embedding model in response to the one or more second inputs.

11. The method of claim 10, wherein the number of utterances is at or above the threshold amount, wherein the combining of the utterances of the plurality of utterances comprises:
splitting the text string into a plurality of utterances; and
merging two or more utterances of the plurality of utterances, wherein the providing of the one or more first inputs to the summary model comprises providing the merged two or more utterances as an input to the summary model.

12. The method of claim 11, further comprising setting a maximum output length parameter of the summary model based on:
a number of utterances after the combining of the utterances; and
a maximum number of input tokens for the embedding model.

13. The method of claim 11, wherein the two or more utterances overlap with one another by a given number of characters.

14. The method of claim 11, wherein determining, based on the one or more first outputs, the summarized version of the text string comprises concatenating a plurality of outputs from the summary model together to produce the summarized version of the text string.

15. The method of claim 10, wherein determining the one or more attributes of the text string based on the one or more second outputs comprises determining whether the text string comprises a particular type of content.

16. The method of claim 15, further comprising
performing one or more actions with respect to the text string based on whether the text string comprises the particular type of content.

17. The method of claim 10, wherein the summary model comprises a transformer model with a bidirectional encoder and an autoregressive decoder.

18. A system for improved text classification, comprising:
one or more processors; and
a memory comprising instructions that, when executed by the one or more processors, cause the system to:
receive a text string comprising a first number of tokens and a number of utterances;
generate one or more first inputs based on the text string by:
if the number of utterances is below a threshold amount, splitting the text into a plurality of utterances, and
if the number of utterances is at or above the threshold amount, combining utterances of the plurality of utterances;
provide the one or more first inputs to a summary model that has been trained to generate subject content summaries of input text;
receive one or more first outputs from the summary model in response to the one or more first inputs, the one or more first outputs including one or more subject content summaries;
determine, based on the one or more first outputs, a summarized version of the text string, wherein:
the summarized version of the text string comprises a second number of tokens that is less than the first number of tokens; and the second number of tokens is less than or equal to a maximum number of input tokens for a machine learning model;

provide, based on the summarized version of the text string, one or more second inputs to the machine learning model; and determine one or more attributes of the text string based on one or more second outputs received from the machine learning model in response to the one or more second inputs.

19. The system of claim 18, wherein the number of utterances is at or above the threshold amount, wherein the combining of the utterances of the plurality of utterances comprises:

splitting the text string into a plurality of utterances; and merging two or more utterances of the plurality of utterances, wherein the providing of the one or more first inputs to the summary model comprises providing the merged two or more utterances as an input to the summary model.

20. The system of claim 19, wherein the instructions, when executed by the one or more processors, further cause the system to set a maximum output length parameter of the summary model based on:

a number of utterances after the combining of the utterances; and a maximum number of input tokens for the machine learning model.

21. The system of claim 19, wherein the two or more utterances overlap with one another by a given number of characters.

* * * * *